US012666374B2

(12) United States Patent
Lee et al.

(10) Patent No.: US 12,666,374 B2
(45) Date of Patent: Jun. 23, 2026

(54) METHOD OF REPEATER GAIN CONTROL, REPEATER AND STORAGE MEDIUM

(71) Applicant: Morelink Technology Corporation, Taipei City (TW)

(72) Inventors: Yung-ting Lee, Taipei City (TW); Chunn-yenn Lin, Taipei City (TW)

(73) Assignee: Morelink Technology Corporation, Taipei City (TW)

( * ) Notice: Subject to any disclaimer, the term of this patent is extended or adjusted under 35 U.S.C. 154(b) by 434 days.

(21) Appl. No.: 18/236,977

(22) Filed: Aug. 23, 2023

(65) Prior Publication Data

US 2024/0073832 A1     Feb. 29, 2024

Related U.S. Application Data

(60) Provisional application No. 63/401,112, filed on Aug. 25, 2022.

(51) Int. Cl.
| | | |
|---|---|---|
| *H04W 52/52* | (2009.01) | |
| *H04B 7/155* | (2006.01) | |
| *H04W 24/08* | (2009.01) | |
| *H04W 52/24* | (2009.01) | |
| *H04W 52/36* | (2009.01) | |

(52) U.S. Cl.
CPC ........ *H04W 52/52* (2013.01); *H04B 7/15535* (2013.01); *H04W 24/08* (2013.01); *H04W 52/245* (2013.01); *H04W 52/367* (2013.01)

(58) Field of Classification Search
CPC ... H04W 52/52; H04W 24/08; H04W 52/245;
H04W 52/367; H04W 52/46; H04W 52/247; H04W 72/0473; H04W 52/16; H04W 36/30; H04W 52/223; H04W 52/18; H04W 52/24; H04W 52/0229; H04W 88/04; H04B 7/15535; H04B 17/309; H04B 17/327; H04B 1/0475; H04B 17/21; H04B 17/328; H04B 7/15; H04B 17/40
See application file for complete search history.

(56) References Cited

U.S. PATENT DOCUMENTS

| | | | | |
|---|---|---|---|---|
| 2008/0182511 A1* | 7/2008 | Adkins | .............. | H04B 7/15535 |
| 2009/0176456 A1* | 7/2009 | Hara | ..................... | H04W 52/54 |
| 2015/0327190 A1* | 11/2015 | Lotter | ................... | H04W 52/46 |
| 2016/0165587 A1* | 6/2016 | Durcan | ................ | H04W 24/08 |
| 2020/0112381 A1* | 4/2020 | Barnes | ................. | H04W 52/52 |
| 2021/0126701 A1* | 4/2021 | Patel | ................... | H04W 52/245 |
| 2021/0359748 A1* | 11/2021 | Kim | ................... | H04B 7/15535 |
| 2024/0040521 A1* | 2/2024 | Fu | ....................... | H04W 52/245 |
| 2024/0137107 A1* | 4/2024 | Lin | ....................... | H04W 52/46 |

* cited by examiner

*Primary Examiner* — Lana N Le

(57) ABSTRACT

Provided is a method of repeater gain control, repeater and storage medium. The repeater is used to amplify cellular communication signals between a base station and a user equipment. The method includes estimating a power of received signals by utilizing a measured power of pre-defined patterns or symbols of the received signals; and determining a gain of the repeater based on the estimated power of received signals. In this method, the overall performance of the repeater can be enhanced.

11 Claims, 1 Drawing Sheet

100

110 — estimating a power of received signals by utilizing a measured power of pre-defined patterns or symbols of the received signals 120 — determining a gain of the repeater based on the estimated power of received signals

METHOD OF REPEATER GAIN CONTROL, REPEATER AND STORAGE MEDIUM

CROSS REFERENCE TO RELATED APPLICATION

This application claims the benefit of priority under 35 USC §119(e) of U.S. Provisional Application No. 63/401, 112, filed on Aug. 25, 2022, the contents of which are incorporated by reference as if fully set forth herein in their entirety.

TECHNICAL FIELD

The present application relates to wireless communication technologies, and more particularly to a method of repeater gain control, a repeater and a storage medium.

BACKGROUND

In wireless communication systems, signals are exchanged between a base station (e.g., a cell tower, or gNB in 5G NR (New Radio)) and one or more mobile terminals or user equipments (UEs). The base station can provide services within a coverage area, which may be expanded by a use of repeaters. The repeaters can improve the quality of wireless communication by receiving, filtering, amplifying and re-transmitting the signals communicated between the base station and the one or more UEs in both an uplink direction (i.e., from the UE to the base station) and a downlink direction (i.e., from the base station to the UE).

The repeater can receive downlink signals from the base station via the repeater's Donor antenna mounted externally or internally, amplify the downlink signals and then provide amplified downlink signals to the UE via the repeater's Service antenna such that the UE can receive stronger signals from the base station. On the contrary, uplink signals from the UE are directed to the repeater and amplified by the repeater before sent to the base station. In other words, the repeater acts as a RF (Radio Frequency) signal relay between the base station and the UE.

For a repeater, it typically consists of multiple gain stages. Generally speaking, these gain stages can be grouped as Rx Gain and Tx Gain. The total gain of the repeater may be considered as a sum of Rx Gain and Tx Gain. The design principle of Rx Gain is to have the (sub-)optimal reception quality for the following signal processing, while Tx Gain is to make sure the HPA (High Power Amplifier) is working in the linear range all the time. The control of Rx Gain is achieved by AGC (Auto Gain Control), while the control of Tx Gain is by ALC (Auto Level Control). The working principle of AGC and ALC is based on the RSS (Received Signal Strength) measurement. That is, the control of Rx Gain and Tx Gain is determined according to the RSS measured by the repeater. As a result, the measurement duration is an important topic, where careful design is required. If the duration is too short, the measured power is pretty variant due to PAPR (Peak to Average Power Ratio). On the other hand, if the duration is too long, the measured power would be unable to meet the requirement of dynamic response. Basically, it is designed that the measurement duration is more than one symbol (e.g., OFDM (Orthogonal Frequency Division Multiplexing) symbol) and the control period of AGC and ALC is frame-based, where one frame consists of a certain number of symbols. For an analog repeater, the Tx Gain is usually fixed and, hence, AGC should keep the Rx Gain as fixed as possible so that the total repeater gain can be a fixed value. For a digital repeater, both the Rx and Tx gains are, however, configurable. Therefore, synchronization of the two control loops is very important for the digital repeater to maintain a fixed value for the total repeater gain.

In practice, the received signal strength (RSS) at a repeater receiver is varied in the field. Therefore, an appropriate RSS hysteresis range is usually defined for AGC to control the Rx Gain to effectively reduce the Rx Gain fluctuations due to the varied received power. When RSS is within the hysteresis range, the Rx Gain remains fixed. Moreover, when RSS is above or below the hysteresis range, the Rx Gain is decreased or increased in pre-defined steps, respectively.

Ideally, the Donor antenna of a repeater should be installed in a position, where the DL RSS is relatively stable, say the RSS variation is within 3 dB. However, this is impractical in the real world, especially when the base station (BS) loading, namely radio resource utilization, is variant with time. Generally speaking, when the BS loading is getting heavier, the effective coverage area of the BS is getting smaller. On the contrary, the effective coverage area of the BS is getting larger when the BS loading is getting lighter. This is called cell breathing effect and causes the RSS within the coverage to vary by up to 8 dB. It also means that the RSS at the repeater's Donor antenna will vary equally. As a result, the repeater sometimes operates within the ALC range (that is, at the time the output transmit power is limited by the ALC since the output transmit power cannot be increased without a limit), which means the repeater gain is no longer always fixed.

Traditionally, the field engineer would keep a fixed margin such as 8 dB of the repeater gain at commissioning to account for this issue (that is, this will lead to a smaller repeater gain all the time). However, the RSS variation due to cell breathing is never a fixed number but depends on the cell loading.

As described above, the DL RSS received by a repeater varies with the DL resource utilization and, hence, the traditional RSS-based gain control scheme is not well suited for repeater. Therefore, a repeater gain control scheme needs to be provided to alleviate this problem caused by keeping the repeater gain constant for as long as possible regardless of how many resources are used for transmissions. The overall performance of the repeater is limited in traditional scheme.

SUMMARY

The objective of the present application is to provide a method of repeater gain control, a repeater and a storage medium, for solving the problems in the existing arts to enhance the overall performance of the repeater.

To achieve above objective, in an aspect, the present application provides a method of repeater gain control for a repeater, in which the repeater is used to amplify cellular communication signals between a base station and a user equipment, the method including: estimating a power of received signals by utilizing a measured power of pre-defined patterns or symbols of the received signals; and determining a gain of the repeater based on the estimated power of received signals.

In another aspect, the present application provides a repeater, used to amplify cellular communication signals between a base station and a user equipment, the repeater including: a Rx circuit; a Tx circuit; and a controller, coupled to the Rx circuit and the Tx circuit, the controller being configured to: estimate a power of received signals by utilizing a measured power of pre-defined patterns or symbols of the received signals; and determine a gain of the repeater based on the estimated power of received signals.

In still another aspect, the present applicant provides a non-transitory machine-readable medium, including a plurality of instructions, when executed by a machine, the instructions cause the machine to perform the afore-described method of repeater gain control.

Above all, the present application provides the method of repeater gain control, the repeater and the storage medium as described above. In this repeater gain control method, a power of received signals is estimated by the repeater by utilizing a measured power of pre-defined patterns or symbols of the received signals, and a gain of the repeater is determined based on the estimated power of received signals. Since the pre-defined patterns or symbols of the received signals are utilized in estimating the power of received signals, the estimated power of received signals can reflect the cell loading in downlink direction (or the UE loading in uplink direction). Therefore, the repeater gain can be determined based on this without a need to backoff the maximum gain of the repeater by a certain amount of gain value. The repeater can operate in a more flexible gain range. Therefore, the overall performance of the repeater is enhanced.

DETAILED DESCRIPTION

In this document, a combination such as "at least one of A, B, or C," "one or more of A, B, or C," "at least one of A, B, and C," "one or more of A, B, and C," or "A, B, and/or C" may be A only, B only, C only, A and B, A and C, B and C, or A and B and C, where any combination may contain one or more members of A, B, or C.

In order to keep a repeater transparent to the mobile network, the repeater has to operate with a fixed linear gain. In this document, Adaptive Repeater Gain Control (ARGC) is proposed to achieve the goal.

Instead of backoff the maximum gain of the repeater by a certain fixed amount of gain value to accommodate the cell loading in traditional scheme, this application provides a method of repeater gain control (RGC), a repeater and a storage medium to improve the repeater performance.

In the present invention, a power of received signals (e.g., received signal strength (RSS)) is estimated by the repeater by utilizing a measured power of pre-defined patterns or symbols of the received signals (the patterns or symbols may be included in synchronization signals, preambles, pilots or reference signals, for example). Based on the estimated power of received signals, the gain of the repeater can be determined. Since the estimated power of received signals can reflect the cell loading in downlink direction (or the UE loading in uplink direction), there is no need to backoff the maximum gain of the repeater by a certain fixed amount of gain value, like that done in the traditional scheme. The repeater can operate in a more flexible gain range. Therefore, the overall performance of the repeater is enhanced.

Figure 1:
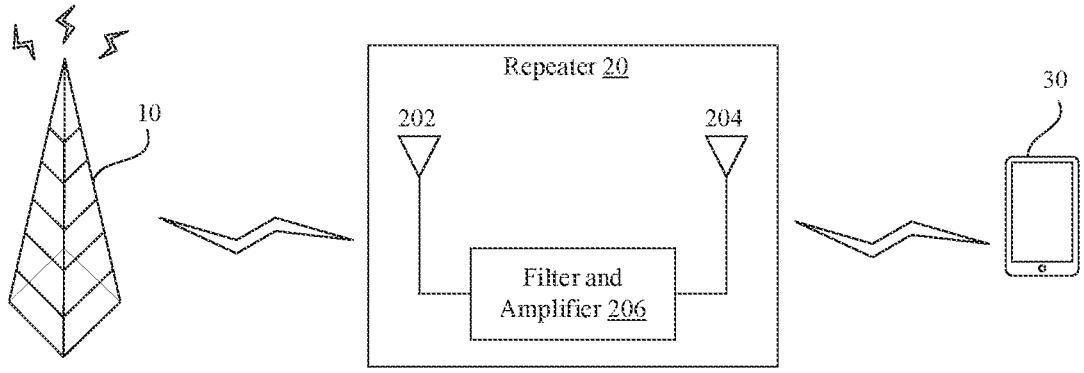
FIG. 1 is a schematic diagram illustrating an exemplary repeater in communication with a base station and a user equipment.

FIG. 1 illustrates an exemplary repeater 20 in communication with a base station 10 and a user equipment (UE) 30. The repeater 20, arranged between the base station 10 and the user equipment 30, can improve the quality of wireless communication by receiving, filtering, amplifying and re-transmitting the signals (more specifically, cellular communication signals) communicated between the base station 10 and the user equipment 30 in both an uplink direction (i.e., from the UE 30 to the base station 10) and a downlink direction (i.e., from the base station 10 to the UE 30). Although illustrated by only one user equipment, the repeater 20 may serve more than one user equipments. The repeater 20 may be arranged at a fixed location, such as in a room of a building, or be mounted to a movable object, such as a vehicle.

The repeater 20 may include a donor antenna 202, a filter and amplifier 206 and a service antenna 204. The donor antenna 202 may be mounted externally or internally at a suitable location for receiving downlink signals from the base station 10. The downlink signals are provided to the filter and amplifier 206 to be filtered and amplified based on gain control, and the resulting signals are then provided to the service antenna 204, which can wirelessly communicate the resulting signals to the user equipment 30. In this way, the user equipment 30 can receive stronger signals from the base station 10.

The service antenna 204 may receive uplink signals from the user equipment 30. The uplink signals are provided to the filter and amplifier 206 to be filtered and amplified based on the repeater power control method of this application, and the resulting signals are then provided to the donor antenna 202, which can wirelessly communicate the resulting signals to the base station 10. In this way, the base station 10 can receive the signals from the user equipment 30 that may be located outside of the coverage area of the base station 10.

Figure 2:
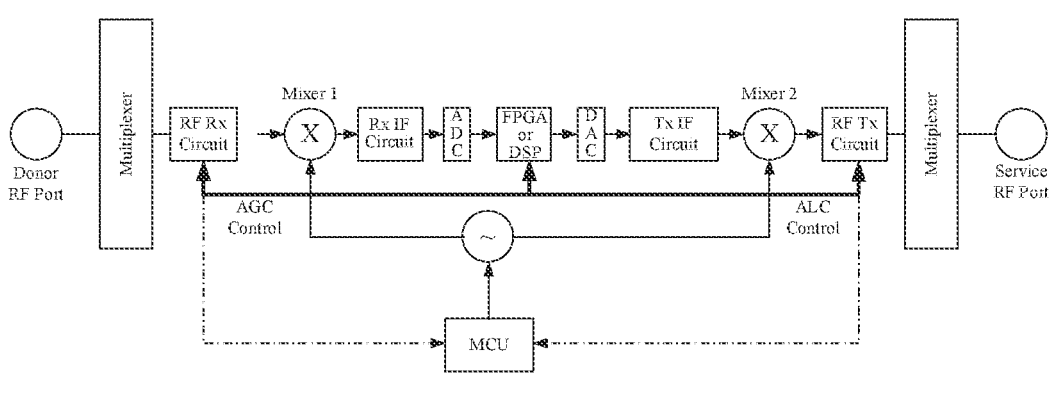
FIG. 2 is a block diagram illustrating a digital FDD repeater according to some embodiments of the present application.

FIG. 2 illustrates a digital frequency division duplex (FDD) repeater. The invention can be implemented not only by the digital FDD repeater illustrated in FIG. 2, but also by other types of repeaters, such as a digital TDD repeater, or a hybrid repeater with mixed analog and digital circuits. It should be noted that the repeater shown in FIG. 2 is illustrated exemplarily in a DL configuration; however, it is straightforward to derive a UL configuration for the repeater. As a result, the UL configuration is omitted for simplicity of description. As shown in FIG. 2, the repeater includes a radio frequency (RF) Rx circuit, an RF Tx circuit and a microcontroller (MCU). In one circuit configuration, for DL signals, the RF Rx circuit may be coupled to a donor RF port (via a multiplexer) which is used to connect to a donor antenna for receiving downlink signals from the base station, and the RF Tx circuit may be coupled to a service RF port (via a multiplexer) which is used to connect to a service antenna for transmitting the downlink signals to the user equipment. In another circuit configuration, for UL signals, the RF Rx circuit may be coupled to the service antenna for receiving uplink signals from the user equipment, and the RF Tx circuit may be coupled to the donor antenna for transmitting the uplink signals to the base station. The MCU coupled to the RF Rx circuit and the RF Tx circuit is configured to control Rx Gain of the RF Rx circuit and Tx Gain of the RF Tx circuit. The total gain of the repeater is considered as a sum of Rx Gain and Tx Gain. The control of Rx Gain is achieved by AGC (Auto Gain Control), while the control of Tx Gain is by ALC (Auto Level Control). In the digital repeater depicted in FIG. 2, both the Rx Gain and the Tx gain are configurable, and thus the control of the total gain of the digital repeater is achieved by controlling the Rx Gain by AGC and controlling the Tx Gain by ALC. Synchronization of the two control loops is necessary for the digital repeater. As depicted in FIG. 2, the digital repeater includes two mixers (i.e., Mixer 1 and Mixer 2) for frequency mixing with carrier frequency, for example. The digital repeater further includes a Rx intermediate frequency (IF) circuit, an analog-to-digital circuit (ADC), a field programmable gate array (FPGA) or digital signal processor (DSP) chip, a digital-to-analog circuit (DAC) and a Tx IF circuit located between the two mixers. The digital repeater performs digital signal processing by using the afore-mentioned circuit elements.

Figure 3:
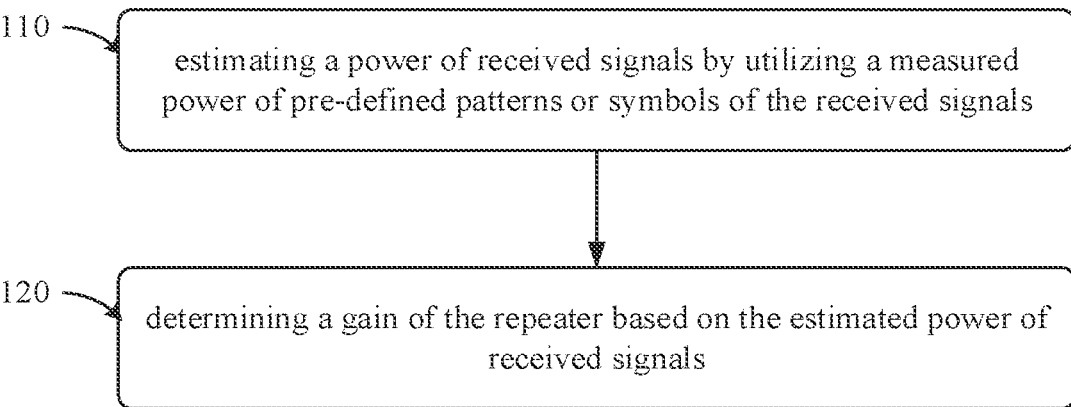
FIG. 3 is a flowchart of a method of repeater gain control for a repeater according to some embodiments of the present application.

FIG. 3 is a flowchart of a method 100 of repeater gain control (RGC) for a repeater according to some embodiments of the present application. The repeater is used to amplify cellular communication signals between a base station (e.g., gNB) and a user equipment (UE). The exemplary structure of the repeater may be referred to FIGS. 1 and 2. The repeater gain control method 100 may be implemented in the MCU, and the FPGA, DSP or other similar electronic components, as depicted in FIG. 2. The method 100 includes the following steps.

It is noted that the invention is to enhance the overall performance of the repeater. Traditionally, the repeater backs off the maximum gain of the repeater by a certain fixed amount of gain value to accommodate the cell loading. This will degrade the repeater performance since the set maximum gain is lowered. Different from the traditional technique, the invention proposes the method to estimate a power of received signals by utilizing a measured power of pre-defined patterns or symbols of the received signals and to determine a gain of the repeater based on the estimated power of received signals. Since the estimated power of received signals can reflect the cell loading in downlink direction (or the UE loading in uplink direction), the repeater gain can be determined based on this without a need to backoff the maximum gain, thereby enhancing the repeater performance.

Step 110: estimating a power of received signals by utilizing a measured power of pre-defined patterns or symbols of the received signals.

In wireless and mobile communications, it is common to embed pre-defined patterns or symbols in the transmitted signal in order to allow a receiver to optimize its reception quality. The pre-defined patterns or symbols include, but are not limited to, synchronization signals, preambles, pilots, and reference signals defined in the different standards. These pre-defined patterns or symbols are transmitted at almost constant power spectrum density. As a result, they are very suitable as the measurement objects of repeater gain control (RGC). Generally speaking, as long as the frequency location, occurrence time and power spectrum density of resource units are pre-defined and/or predictable, they can be used as the measurement objects of RGC for downlink (DL) and even uplink (UL). Once any measurements of these objects are obtained, the associated gain updates can be made by an RGC scheme.

In this step, instead of directly measuring a power of received signals, the repeater utilizes a measured power of pre-defined patterns or symbols of the received signals to estimate a power of received signals. The estimated power (or power level) of received signals can be represented by Received Signal Strength (RSS) estimated by the repeater. The received signals can be downlink signals or uplink signals since both the two types of signals have pre-defined patterns or symbols for performing the power estimation. As described above, the pre-defined patterns or symbols of the received signals may include at least one of synchronization signals, preambles, pilots, or reference signals, and any combination of them is also applicable.

In some embodiments, the power of received signals is estimated based on a power factor associated with a measurement object corresponding to the pre-defined patterns or symbols. The power factor is changeable or updatable, depending on power measurements. The power factor may be updated when a power factor update period expires.

The power factor $F_{power}$ may be defined as follows:

$$F_{power} = \frac{\text{Maximum transmission power} \times f_{util}}{\text{Transmission power of the measurement object}},$$

where $f_{until}$ means the utilization factor of all resources.

For example, 5G NR Secondary Synchronization Signal (SSS) is taken as the DL measurement object for a 5G 100 MHz signal. Then, $$F_{power} = 10 \times \log_{10}(273 \times 12) = 35.15 \text{ dB}, \quad f_{util} = 1.0$$

$$F_{power} = 10 \times \log_{10}(273 \times 12 \times 0.8) = 34.18 \text{ dB}, \quad f_{util} = 0.8$$

Because $f_{until}$ is generally unknown, an update scheme is proposed in the context below (described later), whose power factor update period $T_{pf}$ is defined as follows.

The power factor update period $T_{pf}$ may be configurable and is the period to update the value of power factor $F_{power}$. The new power factor $F_{power}$ is valid for the next RGC control. Note that when the power factor update period $T_{pf}$ is set to infinity, it may mean the power factor $F_{power}$ is a fixed value and can only be updated manually.

When a new object measurement is obtained, say $P_{obj}$, the corresponding estimated RSS is calculated as follows.

$$RSS = P_{obj} + F_{power}$$

In some embodiments, the power factor $F_{power}$ may be updated. Specifically, the power factor $F_{power}$ may be updated based on a measured power of the received signals (e.g., received signal strength indicator (RSSI)) and a measured power of the measurement object (e.g., reference signal receive power (RSRP)). As a result, the subsequent power of received signals is estimated based on the updated power factor. In some embodiments, the measured power of the received signals or the measurement object may be an average or maximum power level measured within a power factor update period. In the power factor update, the average can be any type of average, including moving average, for example.

The power factor update scheme is described as follows:

When the power factor update period $T_{pf}$ expires, F(n) is calculated as follows.

$$F(n) = \frac{\text{Average or Maximum } RSS \text{ Measured at Receiver}}{\substack{\text{Average or Maximum Object Power} \\ \text{Measured at Receiver}}},$$

where F(n) means that it is the result of the nth time. The power factor $F_{power}$ is derived as F(n) or the average of F(n), such as rectangular average, moving average, exponential moving average, and so on. In an illustrated example, the power factor $F_{power}$ may be represented by RSSI/RSRP.

Step 120: determining a gain of the repeater based on the estimated power of received signals.

In this step, the gain of the repeater is determined based on the estimated power of received signals. Since the estimated power of received signals can reflect the cell loading in downlink direction (or the UE loading in uplink direction), the repeater gain determined based on this can accommodate the cell loading (or UE loading) without a need to backoff the maximum gain, like that done in the traditional scheme.

In some embodiments, the determined repeater gain may be a set maximum gain or a maximum output power minus the estimated power of received signals. Specifically, the gain of the repeater may be determined by a minimum of a maximum gain, and a maximum output power minus estimated power of received signals. Setting the minimum of the afore-described two gain values as the repeater gain is to try to avoid the repeater from operating within the ALC range (that is, at the time the output transmit power is limited by the ALC since the output transmit power cannot be increased without a limit). Further details on this feature are described below.

In a case that only Rx AGC is involved, based on above description, the repeater gain is set as follows:

$$G = \text{Min}\{G_{max} \mid (P_{max} - RSS)\}$$

In this case, the gain change of G is achieved by Rx AGC.

In some embodiments, an Rx gain of the repeater may be adjusted by stepwise decrement or increment based on the estimated power of received signals. The Rx gain is decreased in a stepwise decrement manner or is increased in a stepwise increment manner such that the estimated RSS plus the adjusted Rx gain (which can be considered as the power amplified at Rx side) can be kept in an appropriate range. In some embodiments, a Tx gain of the repeater may be determined based on the determined gain and the adjusted Rx gain. The gain of the repeater can be considered as a sum of the Rx gain and the Tx gain, and thus the Tx gain can be obtained based on the repeater gain and the Rx gain. Further details on these embodiments are described below.

In a case that both Rx AGC and Tx ALC are involved, the Rx gain $G_{Rx}$ is set by the AGC scheme as follows:

If RSS + $G_{Rx}$ > $\text{TH}_{UB}$
    $G_{Rx} = \text{Max}\{G_{Rx} - \Delta_D \mid G_{Rx\_min}\}$
Else if RSS + $G_{Rx}$ < $\text{TH}_{LB}$
    $G_{Rx} = \text{Min}\{G_{Rx} + \Delta_I \mid G_{Rx\_max}\}$
Else
    $G_{Rx} = G_{Rx}$ where $G_{Rx\_min}$ and $G_{Rx\_max}$ denote the minimum Rx Gain and maximum Rx Gain, respectively, $\Delta_D$ and $\Delta_I$ denote the stepwise decrement and increment of AGC gain adjustment, respectively, and $\text{TH}_{UB}$ and $\text{TH}_{LB}$ stand for an upper bound threshold and a lower bound threshold, respectively.

Then, in this case, the Tx gain $G_{Tx}$ is set as follows:

$$G = \text{Min}\{G_{max} \mid (P_{max} - RSS)\}$$
$$G_{Tx} = G - G_{Rx}$$

The present application provides the method of repeater gain control as described above. In this repeater gain control method, a power of received signals is estimated by the repeater by utilizing a measured power of pre-defined patterns or symbols of the received signals, and a gain of the repeater is determined based on the estimated power of received signals. Since the pre-defined patterns or symbols of the received signals are utilized in estimating the power of received signals, the estimated power of received signals can reflect the cell loading in downlink direction (or the UE loading in uplink direction). Therefore, the repeater gain can be determined based on this without a need to backoff the maximum gain of the repeater by a certain fixed amount of gain value. The repeater can operate in a more flexible gain range. Therefore, the overall performance of the repeater is enhanced.

The embodiment of the present application further provides a repeater, used to amplify cellular communication signals between a base station and a user equipment. The repeater includes a Rx circuit; a Tx circuit; and a controller, coupled to the Rx circuit and the Tx circuit, the controller being configured to execute corresponding processes implemented in each of the methods of the embodiments of the present application. For brevity, details will not be described herein again.

The embodiment of the present application further provides a computer readable storage medium for storing a computer program. The computer readable storage medium enables a computer to execute corresponding processes implemented in each of the methods of the embodiments of the present application. For brevity, details will not be described herein again.

The embodiment of the present application further provides a computer program product including computer program instructions. The computer program product enables a computer to execute corresponding processes implemented in each of the methods of the embodiments of the present application. For brevity, details will not be described herein again.

The embodiment of the present application further provides a computer program. The computer program enables a computer to execute corresponding processes implemented in each of the methods of the embodiments of the present application. For brevity, details will not be described herein again.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

It should be understood that any embodiments disclosed herein as being "non-transitory" do not exclude any physical storage medium, but rather exclude only the interpretation that the medium can be construed as a transitory propagating signal.

Accordingly, an embodiment of the invention can include a computer readable media embodying a method of gain control for a repeater. The method includes estimating a power of received signals by utilizing a measured power of pre-defined patterns or symbols of the received signals; and determining a gain of the repeater based on the estimated power of received signals. Accordingly, the invention is not limited to illustrated examples and any means for performing the functionality described herein are included in embodiments of the invention.

Thus, the elements and components of an embodiment of the invention may be physically, functionally and logically implemented in any suitable way. Indeed, the functionality may be implemented in a single unit, in a plurality of units or as part of other functional units. Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'including' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Above all, while the preferred embodiments of the present application have been illustrated and described in detail, various modifications and alterations can be made by persons of ordinary skill in the art. The embodiment of the present application is therefore described in an illustrative but not restrictive sense. It is intended that the present application should not be limited to the particular forms as illustrated, and that all modifications and alterations which maintain the spirit and realm of the present application are within the scope as defined in the appended claims.

What is claimed is:

1. A method of repeater gain control for a repeater, in which the repeater is used to amplify cellular communication signals between a base station and a user equipment, the method comprising:

estimating a power of received signals by utilizing a measured power of pre-defined patterns or symbols of the received signals, wherein the power of received signals is estimated based on a power factor associated with a measurement object corresponding to the pre-defined patterns or symbols;

determining a gain of the repeater based on the estimated power of received signals; and updating the power factor based on a measured power of the received signals and a measured power of the measurement object, wherein the subsequent power of received signals is estimated based on the updated power factor.

2. The method according to claim 1, wherein the pre-defined patterns or symbols of the received signals comprise at least one of synchronization signals, preambles, pilots, or reference signals.

3. The method according to claim 1, wherein the measured power of the received signals or the measurement object is an average or maximum power level measured within a power factor update period.

4. The method according to claim 1, wherein the gain of the repeater is determined by a minimum of a maximum gain, and a maximum output power minus the estimated power of received signals.

5. The method according to claim 1, further comprising:

based on the estimated power of received signals, adjusting a Rx gain of the repeater by stepwise decrement or increment; and determining a Tx gain of the repeater based on the determined gain and the adjusted Rx gain.

6. A non-transitory machine-readable medium, comprising a plurality of instructions, when executed by a machine, the instructions cause the machine to perform the method of repeater gain control according to claim 1.

7. A repeater, used to amplify cellular communication signals between a base station and a user equipment, the repeater comprising:

a Rx circuit;

a Tx circuit; and a controller, coupled to the Rx circuit and the Tx circuit, the controller being configured to:

estimate a power of received signals by utilizing a measured power of pre-defined patterns or symbols of the received signals, wherein the power of received signals is estimated based on a power factor associated with a measurement object corresponding to the pre-defined patterns or symbols;

determine a gain of the repeater based on the estimated power of received signals; and update the power factor based on a measured power of the received signals and a measured power of the measurement object, wherein the subsequent power of received signals is estimated based on the updated power factor.

8. The repeater according to claim 7, wherein the predefined patterns or symbols of the received signals comprise at least one of synchronization signals, preambles, pilots, or reference signals.

9. The repeater according to claim 8, wherein the measured power of the received signals or the measurement object is an average or maximum power level measured within a power factor update period.

10. The repeater according to claim 7, wherein the gain of the repeater is determined by a minimum of a maximum gain, and a maximum output power minus the estimated power of received signals.

11. The repeater according to claim 7, wherein the controller is further configured to:

based on the estimated power of received signals, adjust a Rx gain of the repeater by stepwise decrement or increment; and determine a Tx gain of the repeater based on the determined gain and the adjusted Rx gain.

* * * * *